May 20, 1969   D. E. HARRIS ET AL   3,445,148
METHOD OF MAKING POROUS BEARINGS AND PRODUCTS THEREOF
Filed June 8, 1967

INVENTORS.
DWIGHT E. HARRIS &
PETER P. GRAD
BY
their ATTORNEYS.

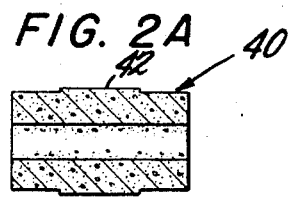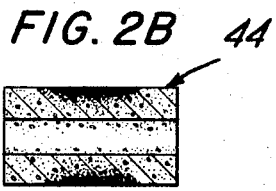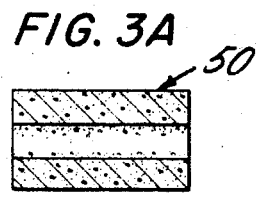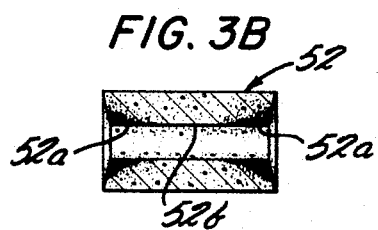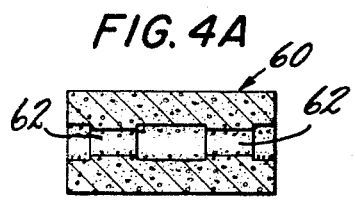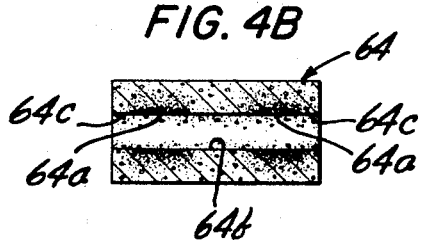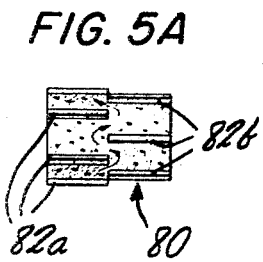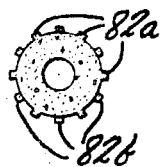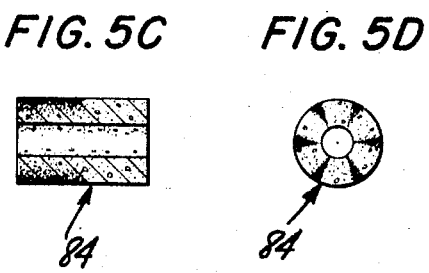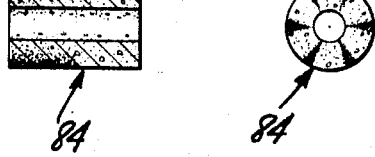

3,445,148
METHOD OF MAKING POROUS BEARINGS AND PRODUCTS THEREOF
Dwight E. Harris and Peter P. Grad, Woodstock, N.Y., assignors to Rotron Incorporated, Woodstock, N.Y., a corporation of New York
Filed June 8, 1967, Ser. No. 644,647
Int. Cl. F16c 9/00, 11/00, 17/00
U.S. Cl. 308—237      2 Claims

ABSTRACT OF THE DISCLOSURE

A method of making porous bearings of compacted and sintered particulate metal by powder metallurgy comprising the steps of first forming a blank with substantial predetermined dimensional variations from the final surface contours in selected portions and thereafter coining the blank to form the final surface contours and further substantally compact the said selected portions of the bearings to increase the density of those portions and therefore their load-carrying ability.

BACKGROUND OF THE INVENTION

This invention relates to porous bearings and, more particularly, to a novel and improved method of making porous bearings and to bearings produced by the method.

Self-lubricating bearings are widely used in machinery of all forms and in many instances provide longer life and increased reliability without the need for frequent and costly maintenance. Various types of bearings possessing self-lubricating features have been developed, one of the important types being those made of a porous material, such as compacted and sintered metals formed by a technique generally known as powder metallurgy. The porous bearing material is impregnated with a lubricant and will often be provided with a lubricant reservoir for replenishing the lubricant.

It has been found that porous bearings perform quite satisfactorily under light and normal loading conditions but fail when subjected to heavier loads. Such failures are believed to be caused by the tendency for lubricant in heavily loaded regions of the bearing surface to be forced back into the porous material. With the loss of lubricant in the more heavily loaded zones, the bearing is subjected to frictional forces that build up thermal stresses and ultimately cause failure.

The above-described problem has been recognized, and solutions for it are proposed, for example, in Sternlicht U.S. Patent Nos. 3,046,068 and 3,110,085. The bearings described and shown in those patents are composed of a lubricant-impregnated porous material with normal porosity in the relatively load-free regions of the bearing surface but with substantially non-porous surfaces in the load-carrying regions. The non-porous surfaces of the bearings are better able to support a lubricant film and eliminate the problem of lubricant being driven into the porous bearing material. The patents describe a process for making the bearings that involves machining the surfaces of a body of porous bearing material with the result that the pores in the material become closed or blocked. Areas of the surfaces which are to constitute the non-porous load-carrying zones are then masked and the bearing surface treated with an acid solution to reopen the blocked pores in the unmasked zones. The bearing is then impregnated with a lubricant. A significant drawback to the Sternlicht technique is that the machining, masking and etching steps are relatively expensive. Moreover, the technique is not adaptable to practical and efficient utilization with bearings having geometries which involve complex machining.

U.S. patent No. 3,395,437, assigned to the assignee of the present application, describes and shows another way of producing a bearing having non-porous material in the load-carrying regions of the bearing surface, the non-porous zones being constituted by bodies of non-porous material which are preformed and then inserted into the die where the powdered material is charged and compressed to form the bearing blank. Although the method of the application has a number of advantages, among them the versatility provided by using a separate insert which can be formed in complex shapes and made of special alloys capable of withstanding thermal and mechanical stresses, it is nonetheless relatively expensive and is also not conveniently adaptable to some geometric forms that may be desired.

SUMMARY OF THE INVENTION

There is provided, in accordance with the invention, a novel and improved method of making a bearing in which the bearing surface is composed of relatively non-porous zones for carrying the bearing loads and porous zones for lubricating the members. The invention also provides bearings made according to the method. The method includes the steps of forming a compacted powdered metal blank with substantial predetermined dimensional variations from the final bearing surface contours in selected portions and thereafter pressing the blank to form the final surface contours and further substantially compact the selected portions to increase the density and therefore the load-carrying ability of those portions. The dimensional variations from the final surface contours are in the form of projections from the normal surface, and the body of compacted metal constituting the porous bearing blank is initially of substantially uniform density. Upon the further pressing of the blank, such further pressing perhaps being better termed coining, the projections on the blank are further compressed and at the same time the final bearing surface contours are obtained. The coining step results in the creation of significantly denser material in the portions that were initially projecting from the bearing surface in the original form of the blank, and these portions of greater density are capable of better supporting a lubricant film and therefore of providing increased load-carrying capability in the bearing.

The method of the invention and the bearing produced by the method provide a number of significant advantages over the method and the bearings previously known in the art. For one thing, the invention lends itself to a wide variety of geometrical forms of bearings, not only the conventional straight, cylindrical bearings, but also flanged sleeve bearings, spherical bearings, mushroom-shaped bearings and so forth. Moreover, any given type of bearing can be formed with different density patterns as required for different applications, the variations in structure depending on, for example, the type of loading, the oil viscosity and whether or not the bearing is rotating. A bearing made in accordance with the invention is characterized by density gradients in the bearing material formed by high density material offering resistance to oil flow in order to provide high loading capability and relatively low density material that provides the desired oil circulation and absorption characteristics. Thus, the versatility afforded by the invention constitutes one of the important benefits obtained.

The method of the invention is also advantageous because of its low cost. In general, the basic techniques of powder metallurgy operations are followed, the usual apparatus with, of course, appropriate modifications of the dies being suitable. In general, the only apparatus that need be provided to supplement the conventional equipment is a forming device to carry out the coining step. Accordingly, the capital investment in tools to manufacture bearings by the method of the invention is not significantly greater than that required for conventional manufacture. Moreover, the coining step lends itself well to automatic equipment and can be carried out at high speeds with little increase in labor costs.

BRIEF DESCRIPTION OF THE DRAWINGS

For a better understanding of the invention, reference may be made to the following description of exemplary embodiments, taken in conjunction with the figures of the accompanying drawing, in which:

FIGS. 2A and 2B show, respectively, a blank before it is coined and the completed bearing embodying one geometrical form;

FIGS. 3A and 3B illustrate, respectively, a blank and a completed bearing embodying another form;

FIGS. 4A and 4B show another embodiment of a blank and bearing, respectively;

FIGS. 5A and 5B show a blank and FIGS. 5C and 5D a completed bearing embodying another geometrical form.

DESCRIPTION OF EXEMPLARY EMBODIMENTS

Figure 1A:
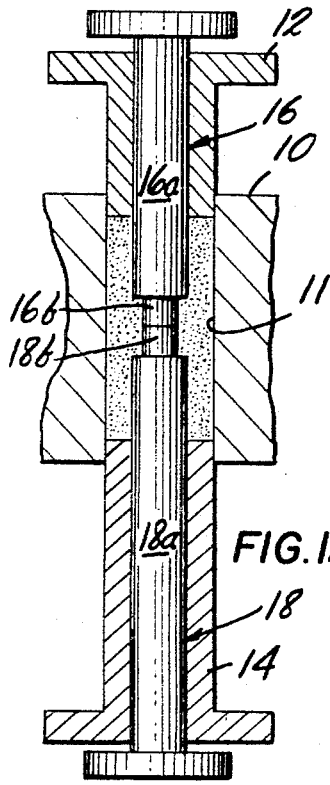
FIGS. 1A to 1D portray the method of the invention by way of schematic illustrations of exemplary apparatus.

As mentioned above, the method of the invention can be carried out using conventional powder metal forming apparatus, except for the addition of a press equipped with a special forming tool for the coining operation. Referring to FIG. 1A, the apparatus for forming a powdered metal blank consists of a die body 10 having a die cavity 11, an upper punch 12, a lower punch 14, an upper core rod 16, and a lower core rod 18. These die components are utilized in either a mechanical or hydraulic press (not shown). The specific design of the die components of course varies according to the desired geometry of the bearing, and it will be understood that various forms of materials can be used, generally the metal for the bearings.

Figure 1B:
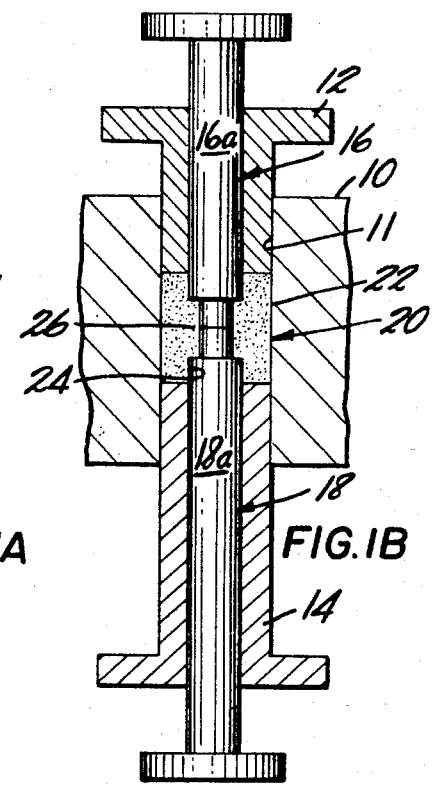

In the particular form shown in FIGS. 1A to 1D, the die components are formed to produce a self-sustaining compacted metal body or "compact" as it is termed in the art, which is identified generally by the reference numeral 20 in FIG. 1B, having a cylindrical outer surface 22 and an inner surface 24 which will be cylindrical in the finished bearing but which is formed initially with a substantial dimensional variation from the final surface contour in the form of an internal projection 26. To this end, the upper and lower core rods 16 and 18 of the die components include cylindrical bodies 16a and 18a, respectively, constituting the major longitudinal portion and reduced diameter tips 16b and 18b which coact to define an annular recess when the core rods abut each other end to end, as shown in FIGS. 1A and 1B, in which the projection 26 of the compact 20 will be formed.

The first step in the method (FIG. 1A) is the charging of a measured amount of the powdered metal into the die cavity 11. FIG. 1A shows the uncompacted powdered metal in place in the die and the upper and lower punches in position to begin the compacting stroke. In charging the powdered material into the die, the upper punch is withdrawn while the other die components are in positions shown, thereby permitting charging of the metal through the top opening. As is well known to those skilled in the art, the powdered metal is a powder of accurately controlled shape and size distribution. Although various materials can be used, generally the metal for the bearings will be bronze.

Referring to FIG. 1B, the powdered material charged into the die is compacted by moving the upper and lower punches 16 and 18 toward each other, thereby consolidating the loose powder to form the compact 20. The degree to which the loose powder is compacted controls the density of the compact and can be established to provide the desired oil circulation and absorption characteristics for the particular bearing. After the compact is formed, it is removed from the die, generally by withdrawing the upper punch and core members 12 and 16 and employing the lower punch 14 to push the compact up and out through the top of the die body 10. The compact is then sintered in a controlled atmosphere to bond the contacting surfaces of the particles and to produce the desired properties, thereby producing a blank of compacted and sintered powder metal. As mentioned above, the blank produced in the die shown in the example of FIGS. 1A and 1D includes an internal projection 26 from the normal internal contour of the bearing surface.

Figure 1C:
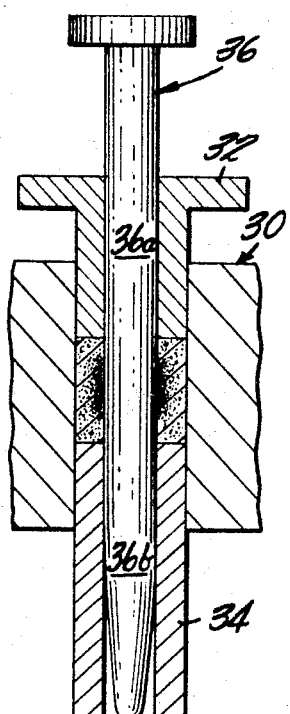
Figure 1D:
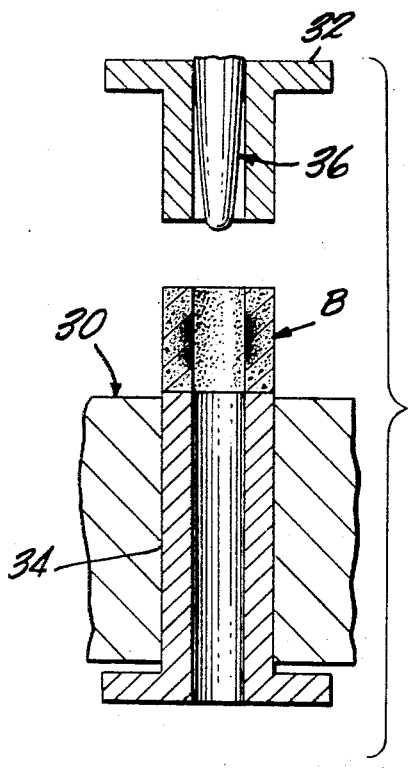

Referring next to FIG. 1C, the blank is then subjected to a further pressing or coining operation carried out in a suitable mechanical or hydraulic press equipped with a forming assembly composed of a die body 30, upper and lower movable retainers 32 and 34 and a forming tool 36. The forming tool 36 is in the form of a pin having a cylindrical main body portion 36a of a diameter substantially equal to the final diameter of the internal surface 24 of the bearing and a tapered end 36b. The blank is inserted into the die body 30, the retainers 32 and 34 are inserted to hold the blank in position and the forming tool is moved down into and through the blank, as portrayed in FIG. 1C. Upon movement of the forming tool 36 through the blank, the tapered end 36b gradually displaces the projection 26 and in so doing further compacts and densifies the porous metal in the region of the projection. The upper holder 32 and the forming tool 36 are then removed (FIG. 1D) and the bearing B is ejected by displacing it upwardly through and out of the die body 30. It may be desirable, and it can sometimes be necessary, to again sinter the bearing after coining and to thereafter perform a finish sizing operation, followed by impregnation with oil in a manner well known to those skilled in the art.

The completed bearing, made in accordance with the method of the invention, is composed of substantially undisturbed, relatively lower density material in those regions of the blank where little if any further compaction took place during the coining operation and a relatively higher density material in the portions where the projection 26 was coined. The portions of relatively greater density are depicted in the drawings by heavier or darker shading. There are, moreover, portions between the lower and higher density zones having a density gradient.

In the example of FIGS. 1A to 1D, the bearing B has a central region of higher density which offers resistance to oil flow in order to provide a high load-carrying capability, whereas the remainder of the bearing surface is of relatively low density material that provides for desired oil circulation and absorption characteristics. Thus, the bearing embodies both a high load capability, by reason of including a surface resistant to the flow of oil which prevents the forcing of oil away from the interface between the shaft and the bearing surface, and excellent self-lubricating properties by virtue of having portions of greater porosity which enable conduction and circulation of lubricant.

As mentioned previously, the method of the invention is applicable to a wide variety of specific bearing geometries, exemplary ones of which are shown in the drawings and described briefly below.

FIGS. 2A and 2B show an embodiment of a bearing made according to the invention in which a blank 40 is initially formed with an external projection 42 in the central region of the bearing surface; in this example, the outer surface of the bearing is the bearing surface, the bearing being designed to be fixed on a rotatable shaft and to be rotatable in its mounting. As shown in FIG. 2B, the blank 40 is coined using suitable forming apparatus to compact and displace the material to arrive at the final cylindrical external contour. Thus, the bearing 44 of FIG. 2B has an external bearing surface which includes a central zone of greater density and lower permeability and porosity providing increased load-bearing capability while the balance of the bearing surface is of lesser density and greater permeability and porosity.

Referring to FIGS. 3A and 3B, a blank 50 having a cylindrical external surface and a cylindrical internal hole is compacted and sintered in the manner described above and is thereafter coined with suitable forming tools to compress the blank in the axial direction to an extent varying from a maximum further compaction of the internal bearing surface to little or no further compaction at the outer surface. As a result of the coining step, the embodiment shown in FIGS. 3A and 3B has portions of maximum density at the ends of the internal surface and a generally linear density gradient between each end and the longitudinal center. This is because the compaction of the material varies substantially linearly and inversely with the distance of a given point from the forming tool. It will also be apparent that the density of the bearing material decreases in the radially outward direction. Thus, the bearing 52 of FIG. 3B has load-bearing portions 52a of relatively greater density and lower permeability and porosity in the zones adjacent the ends of the internal surface and a zone 52b of relatively lower density and higher permeability and porosity in the longitudinally central portion of the bearing surface.

FIGS. 4A and 4B show another embodiment of a bearing having an internal bearing surface. A blank 60 is formed with internal projections 62 from the final cylindrical contour (FIG. 4A) spaced from each other and from each end, these portions being displaced and further compacted to form load-carrying zones 64a of greater density in the finished bearing 64 (FIG. 4B) and a central zone 64b and end zones 64c of lesser density providing for oil circulation and absorption. This embodiment is well suited for relatively long bearings and has the advantages of (1) providing spaced load-supporting regions that better support and align a shaft and (2) permitting good oil circulation in toroidal patterns at each end between the central zone 64b and the respective end zones 64c.

FIGS. 5A to 5D illustrate an embodiment in which relatively high density portions alternate in the circumferential direction with relatively low density portions. More particularly, as shown in FIGS. 5A and 5B, a compacted and sintered metal blank 80 can be formed with projections constituted by spaced apart, longitudinally extending ribs 82a and 82b on its outer surface. The projecting ribs can be formed in two groups on opposite sides of the central bisector plane of the bearing, the ribs 82a of one group being staggered with respect to those ribs 82b of the other group. After the coining operation there are two sets of circumferentially spaced oil circulation zones constituted by relatively low density portions of the finished bearing 84 (FIGS. 5C and 5D). These zones are in end to end communication with each other so that oil circulation through the bearing will take place along a tortuous path, as depicted generally by the arrowed lines in FIG. 5A. The relatively higher density portions created by coining the blank to compact and displace the projections 82 are thus distributed about the circumference of the outer surface of the bearing 84 and are well supplied with oil by virtue of the tortuous path of oil circulation and the disposition of oil circulation zones between them. A bearing embodying the principles of the one disclosed in FIGS. 5A to 5D can readily be made with an internal bearing surface of similar geometry.

The above-described embodiments of the invention are intended to be merely exemplary, and those skilled in the art will be able to make numerous variations and modifications of them without departing from the spirit and scope of the invention. All such variations and modifications are intended to be included within the scope of the invention as defined in the appended claims.

We claim:
1. A method of making porous sleeve bearings of compacted and sintered particulate metal by powder metallurgy techniques comprising the steps of compressing a body of powdered metal in an annular die cavity having spaced inner and outer walls having selected portions at substantially different spacings from the spacings of other portions thereby to form a hollow compacted body having substantial predetermined variations in wall thickness and projections from the final bearing surface thereof, removing the compacted body from the die cavity, sintering the compacted body to form a blank, and compressing the blank substantially radially to form a substantially cylindrical bearing surface thereon by further compacting the blank material in the projecting portions thereof thereby to increase the load-carrying ability of those portions.

2. A sleeve bearing formed of compacted sintered powdered metal by powder metallurgy techniques comprising an annular hollow sleeve of compacted and sintered powder metal, at least one wall of which is cylindrical and constitutes a bearing surface, the bearing surface of the sleeve having at least one portion of relatively greater density and lesser porosity than the remainder thereof, and the sleeve in the region of said portion having a density gradient resulting from coining a compacted sintered blank having a substantial projection from the final cylindrical bearing surface.

References Cited
UNITED STATES PATENTS
2,615,766  10/1952  Wallace _____ 308—237
2,894,792  7/1959  Brilli _____ 308—240

MARTIN P. SCHWADRON, *Primary Examiner.*

FRANK SUSKO, *Assistant Examiner.*

U.S. Cl. X.R.
29—149.5

PO-1050
(5/69)

UNITED STATES PATENT OFFICE
CERTIFICATE OF CORRECTION

Patent No. 3,445,148      Dated  May 20, 1969

Inventor(s)  D. E. Harris et al.

It is certified that error appears in the above-identified patent and that said Letters Patent are hereby corrected as shown below:

Column 1, line 19, "substantally" should be -- substantially --;

Column 3, line 58, now reading "materials can be used, generally the metal for the bear-", should read -- dies, including somewhat more complex ones, are possible --;

Column 4, line 30, "and" should be -- to --.

SIGNED AND
SEALED
NOV 18 1969

(SEAL)
Attest:

Edward M. Fletcher, Jr.
Attesting Officer

WILLIAM E. SCHUYLER, JR.
Commissioner of Patents